US012748589B2

(12) United States Patent
Li et al.

(10) Patent No.: US 12,748,589 B2
(45) Date of Patent: Sep. 29, 2026

(54) METHOD, SYSTEM AND PROCESSOR FOR ENHANCING ROBUSTNESS OF SOURCE-CODE CLASSIFICATION MODEL

(71) Applicant: Huazhong University of Science and Technology, Wuhan (CN)

(72) Inventors: Zhen Li, Wuhan (CN); Junyao Ye, Wuhan (CN); Deqing Zou, Wuhan (CN); Hai Jin, Wuhan (CN); Xianghong Zeng, Wuhan (CN)

(73) Assignee: HUAZHONG UNIVERSITY OF SCIENCE AND TECHNOLOGY, Wuhan (CN)

( * ) Notice: Subject to any disclaimer, the term of this patent is extended or adjusted under 35 U.S.C. 154(b) by 262 days.

(21) Appl. No.: 18/650,290

(22) Filed: Apr. 30, 2024

(65) Prior Publication Data

US 2025/0013463 A1 Jan. 9, 2025

(30) Foreign Application Priority Data

Jul. 4, 2023 (CN) ......................... 202310812492.3

(51) Int. Cl.
*G06F 9/44* (2018.01)
*G06F 8/73* (2018.01)
*G06V 10/764* (2022.01)

(52) U.S. Cl.
CPC .............. *G06F 8/73* (2013.01); *G06V 10/764* (2022.01)

(58) Field of Classification Search
None
See application file for complete search history.

(56) References Cited

FOREIGN PATENT DOCUMENTS

CN 108108184 6/2018
CN 113760358 12/2021
(Continued)

OTHER PUBLICATIONS

Jain et al. ("Contrastive Code Representation Learning," 2021) (Year: 2021).*
(Continued)

*Primary Examiner* — Insun Kang
(74) *Attorney, Agent, or Firm* — Michael Ye; Kalos Athena Wang PLLC

(57) ABSTRACT

A method, system and processor for enhancing robustness of a source-code classification model based on invariant features is provided, wherein the method includes: combining non-robustness features to generate different style templates, converting codes in an input code training set into new codes of different styles to obtain a converted-code training set, merging the input-code and the converted-code training set into an expanded training set, and converting code texts in the expanded training set into code images; and converting the code images into required vectors, pairing samples of identical class randomly picked from the expanded training set and inputting the matched sample pairs into a feature extractor, iteratively updating the feature extractor and the matched sample pairs and extracting target characteristics, and training the extracted invariant features in a classifier to produce a trained model. The disclosed system includes a training set-expanding module and a model-training module.

15 Claims, 4 Drawing Sheets

(56) References Cited

FOREIGN PATENT DOCUMENTS

| | | | | |
|---|---|---|---|---|
| CN | 114503108 | | 5/2022 | |
| CN | 115630358 A | * | 1/2023 | ........... G06F 21/561 |

OTHER PUBLICATIONS

Chang et al.; "Towards Robust Classification Model by Counterfactual and Invariant Data Generation" (Year: 2021).*

Li et al.; "RoPGen: Towards Robust Code Authorship Attribution via Automatic Coding Style Transformation," 2022 (Year: 2022).*

Wong, Marvolo: Programmatic Data Augmentation for Practical ML-Driven Malware Detection (Year: 2022).*

Peng et al., "Learning Invariant Representation via Contrastive Feature Alignment for Clutter Robust SAR Target Recognition" is related to a mixed clutter variants generation strategy and a new inference branch (Year: 2023).*

Guo et al. ("Graphcodebert: Pre-Training Code Represen Tations With Data Flow") is related to GraphCodeBERT based on Transformer. (Year: 2020).*

* cited by examiner

METHOD, SYSTEM AND PROCESSOR FOR ENHANCING ROBUSTNESS OF SOURCE-CODE CLASSIFICATION MODEL

This application claims priority to Chinese Patent Application No. CN 202310812492.3 filed on Jul. 4, 2023, which is hereby incorporated by reference as if fully set forth herein.

BACKGROUND OF THE APPLICATION

Field

The present disclosure generally relates to research on robustness of deep learning models, especially to enhancement of robustness of models for source code classification (SCC), and more particularly to a method, system and processor for enhancing robustness of a source-code classification model, based on invariant features.

Description of Related Art

With continuous development and popularization of computer technology, software has been extensively applied in various fields. However, applications of software have brought about some security-related concerns. As a possible solution to these concerns, source code classification (SCC) is picking more and more attention among security researchers and applied to vulnerability detection, code authorship identification, clone detection, etc. As compared with existing solutions, deep learning models are more capable of learning features of various types, such as vulnerability patterns, coding modes, habits, syntax, structures and styles, thereby accomplishing automatic detection of vulnerability, automatic identification of code authorship, and detection of similar code colons. Deep learning models are more accurate and more expandable than known methods, and thus are capable of recognizing structures and patterns in codes accurately.

Currently, robustness enhancement of a deep learning model is achieved using:

1. Data augmentation: increasing diversity of data through transformation during training, so as to reduce the trained model from overfitting particular data distribution;
2. Regularization: adding a regularization item to the loss function, so as to limit the weighting parameter and prevent the trained model from overfitting;
3. Adversarial training: enhancing robustness of the model by improving the model for improved prediction accuracy in adversarial samples; or
4. Classful-addressing structure: using a network structure with higher robustness, such as a convolutional neural network, to strengthen the model in terms of generalization ability.

CN114503108A discloses a method and system for securing a trained machine learning model by one or more processors in a computing system. By adding antagonism protection to one or more trained machine learning models, one or more augmented machine learning models may defend against antagonism attacks.

CN108108184A discloses a method of authorship identification for source codes based on a deep learning network, which is related to web mining and information extraction. The known method includes the following steps: constructing a source code data set and pre-processing the source code data; extracting source code feature using a continuous n-gram code segment model; training the deep learning network model by training source code file samples; and performing authorship identification for source code files using the trained deep learning network model, and outputting results of authorship identification of the source code files.

CN113760358A discloses a method for generating adversarial examples towards source code classification models, including data pre-processing, extraction of active code-switching modes, selection of candidate switching modes, switching, attack testing and rewarding. The known method provides an executable adversarial operation according to the structure information of the source codes, and incorporates a Markov decision process and a time sequence difference algorithm, while guiding operational selection with impact factors during adversarial operation, thereby continuously refining adversarial generation.

However, these methods for enhancing robustness of deep learning models are not really applicable to source-code classification models unless the following challenges can be overcome.

The first challenge is data scantiness. Training a deep learning model for better robustness requires mass data, yet this is a problem in the field of source codes. This raises the need for effective use of limited data in model training.

The second challenge is about feature extraction. In the art of source code analysis, features of codes are expressed in a relatively complicated manner, making extracting effective code features difficult. To be particular, different types of codes may need different feature extraction methods, and even with relevant methods, extraction of code features may be dependent on code styles, naming conventions, and other variables that need to be considered for consistent results.

The last challenge comes from adversarial attacks by which attackers intentionally interfere with and cheat models. These attacks are an obstacle to good model robustness. In the art of source codes, adversarial attacks may be designed for different features of codes and therefore need to be addressed differently.

Since there is certainly discrepancy between the existing art comprehended by the applicant of this patent application and that known by the patent examiners and since there are many details and disclosures disclosed in literatures and patent documents that have been referred by the applicant during creation of the present disclosure not exhaustively recited here, it is to be noted that the present disclosure shall actually include technical features of all of these known works, and the applicant reserves the right to supplement the application with the related art more existing technical features as support according to relevant regulations.

SUMMARY

In view of the shortcomings of the art known by the inventor(s), the objective of the present disclosure is to provide a method, system and processor for enhancing robustness of a source-code classification model, and more particularly a method, system and processor for enhancing robustness of a source-code classification model based on invariant features, in order to at least overcome limits in enhancement of source code robustness. To be specific to different features of source codes and to address defects of the existing models as described above, the present disclosure expands the training set by switching code styles, thereby improving source-code classification models in terms of robustness while defending source code models from attacks.

The present disclosure provides a method for enhancing robustness of a source-code classification model, based on invariant features, wherein the method at least includes steps of:

combining non-robustness features to generate a plurality of different style templates, converting codes in an input code training set into new codes of different styles using a code conversion program, so as to obtain a converted-code training set composed of the new codes, merging the input code training set and the converted-code training set into an expanded training set, and converting code texts in the expanded training set into code images; and converting the code images into vectors required by model training through data pre-processing, randomly picking samples of an identical class from the expanded training set, pairing the samples into matched sample pairs, and inputting the matched sample pairs into a feature extractor, iteratively updating the feature extractor and the matched sample pairs by means of contrastive learning and extracting target characteristics, and training the extracted invariant features in a classifier, so as to produce the source-code classification model with enhanced robustness.

According to a preferred mode, the step of "combining non-robustness features to generate a plurality of different style templates" comprises: analyzing the existing source-code classification model and attack means that have been applied thereto, and summarizing transformation target characteristics and transformation modes generated by the attack means for attacking code samples, wherein the target characteristics receiving attacks are used as the non-robustness features for classification, and different combinations of the non-robustness features are picked to form the different style templates distinctive from each other.

According to a preferred mode, the step of "converting codes in an input code training set into new codes of different styles using a code conversion program, so as to obtain a converted-code training set composed of the new codes, merging the input code training set and the converted-code training set into an expanded training set" comprises: applying the code conversion program to the input code training set, according to code style templates performing directional transformation of the style templates on the codes in the input code training set, so as to generate the new codes semantically unchanged but changed in style, wherein each of the style templates is associated with a said converted-code training set, and the input code training set and the converted-code training set are merged into the expanded training set.

According to a preferred mode, the step of "converting code texts in the expanded training set into code images" comprises: using a text-image conversion tool to process the code texts of the expanded training set, and generating the specially processed code images from the input code texts.

According to a preferred mode, the "data pre-processing" comprises: converting the pre-processed code images into the vectors usable in model training, wherein the pre-processing includes but is not limited to scaling, cutting and/or normalization.

According to a preferred mode, the step of "randomly picking samples of an identical class from the expanded training set, pairing the samples into matched sample pairs, and inputting the matched sample pairs into a feature extractor" comprises: randomly picking the samples of the identical class and of different said training sets from the expanded training set composed of the input code training set and the converted-code training set, and pairing the samples.

According to a preferred mode, the step of "iteratively updating the feature extractor and the matched sample pairs by means of contrastive learning and extracting target characteristics" comprises: dividing the model into two parts, namely the feature extractor and the classifier, inputting the randomly picked pairs of the samples of the identical class into the feature extractor, figuring out differences among the samples using a contrastive loss function, iteratively updating the feature extractor and the matched sample pairs, replacing the randomly picked sample pairs with new sample pairs, and performing training iteratively until training of the feature extractor reaches convergence.

According to a preferred mode, the step of "training the extracted invariant features in a classifier" comprises: inputting the latest sample pairs into the feature extractor, extracting the target characteristics, and inputting the target characteristics into the classifier for training, until training of the classifier reaches convergence.

The present disclosure provides a system for enhancing robustness of a source-code classification model, based on invariant features, wherein the system comprises:

a training set-expanding module, for combining non-robustness features to generate a plurality of different style templates, converting codes in an input code training set into new codes of different styles using a code conversion program, so as to obtain a converted-code training set composed of the new codes, merging the input code training set and the converted-code training set into an expanded training set, and converting code texts in the expanded training set into code images; and a model-training module, for converting the code images into vectors required by model training through data pre-processing, randomly picking samples of an identical class from the expanded training set, pairing the samples into matched sample pairs, and inputting the matched sample pairs into a feature extractor, iteratively updating the feature extractor and the matched sample pairs by means of contrastive learning and extracting target characteristics, and training the extracted invariant features in a classifier, so as to produce the source-code classification model with enhanced robustness.

According to a preferred mode, the training set-expanding module includes a style template generation sub-module, a directional transformation and augmentation sub-module, and a text-to-image conversion sub-module. The model-training module includes a data pre-processing sub-module, a sample pair picking sub-module, an iterative updating sub-module, and a classifier training sub-module.

According to a preferred mode, the style template generation sub-module is for analyzing existing source-code classification models and attack means against them, and summarizing transformation target characteristics and transformation modes generated by the attack means for attacking code samples, wherein the target characteristics receiving attacks are named as non-robustness features and are classified, and different combinations of the non-robustness features are picked to form the different style templates distinctive from each other.

According to a preferred mode, the directional transformation and augmentation sub-module is for performing a code synonymous substitution process on the input code training set, wherein the code samples is subject to directional conversion of the template style according to code style templates to generate a new code semantically unchanged but changed in style. A converted-code training set is generated for one template style, and the input code training set and the converted-code training set are merged into the expanded training set.

According to a preferred mode, the text-to-image conversion sub-module is for using a text-image conversion tool to process the input code texts of the expanded training set so as to generate specially processed code images. Therein, the specially processed code images are preferably highlighted code images.

According to a preferred mode, the data pre-processing sub-module is for preforming necessary processing on the images, such as scaling, cutting and normalization, and converting the images into vectors that can be used in training of the model.

According to a preferred mode, the sample pair picking sub-module is for randomly extracting samples that are of the same class but belong to different training sets from the expanded training set composed of the input code training set and the converted-code training set so as to conduct pairing.

According to a preferred mode, the iterative updating sub-module is for dividing the model into two parts, namely the feature extractor and the classifier, inputting the random same-class sample pairs to the feature extractor, figuring out differences among the samples using a contrastive loss function, iteratively updating the feature extractor and the matched sample pairs, replacing the randomly picked sample pairs with new sample pairs, performing training iteratively until training of the feature extractor reaches convergence.

According to a preferred mode, the classifier training sub-module is for inputting the latest sample pairs into the feature extractor where the target characteristics are extracted and subsequently input to the classifier for training, until training of the classifier reaches convergence. Therein, the target characteristics are invariant high-robustness features.

The present disclosure provides a processor, which comprises the inventive system as described previously or can execute the inventive method as described previously via a computer program. Therein, the computer program may be stored in a storage medium.

The general conception of the present disclosure is about using a code conversion program to directionally augment the input code training set into training sets of different styles; after transformation and pre-processing, randomly extracting samples of the same class from the expanded training sets for pairing and inputting the paired samples into the feature extractor of the model; iteratively updating the feature extractor and the matched sample pairs by means of contrastive learning so as to train and get a feature extractor capable of extracting invariant features; and using the extracted invariant features to train the classifier part of model and outputting a high-robustness model.

The present disclosure has the following technical benefits:

1. Being adaptable to different types of classification models: the disclosed method and system are suitable for classification models used in vulnerability detection, code authorship attribution, and clone detection;
2. Improving model robustness: with the training sets expanded particularly for non-robustness features, the resulting model is more adaptable to various code texts, and by training the model with invariant features, model robustness can be improved; and
3. Helping defending from various attacks: the present disclosure helps defending from adversarial sample attacks with improved robustness, and is effective in defending from the latest melee attacks related to invisible characters by means of extracting image features.

DETAILED DESCRIPTION

The present disclosure will be described in detail with reference to the accompanying drawings.

Embodiment 1

Figure 1:
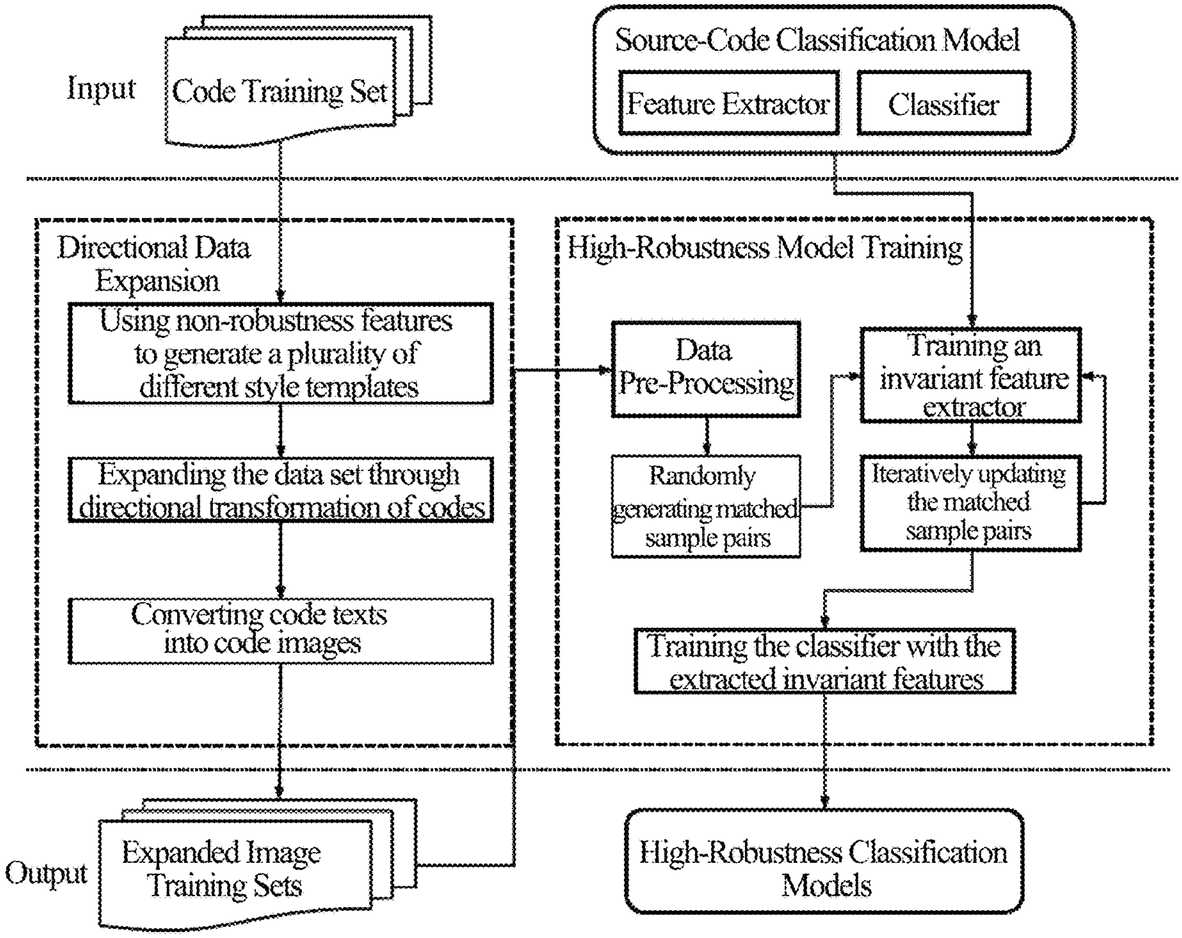
FIG. 1 is a flowchart of a method for enhancing robustness of a source-code classification model based on invariant features according to one preferred mode of the present disclosure.

The present disclosure provides a method for enhancing robustness of a source-code classification model based on invariant features, whose process is shown in FIG. 1. Preferably, in a code, there are some features whose changes will not semantically or functionally alter the code, such as renaming variables, changing variables from single-line to multiline definitions, converting for loop into while loop, etc. All the features in a code other than the foregoing non-robustness features, when changed, can impact the code semantically and/or functionally, and are known as invariant features.

Preferably, the method at least comprises the following steps:

S1, directional augmentation for training sets: combining non-robustness features to generate a plurality of different style templates, converting codes in an input code training set into new codes of different styles using a code conversion program, so as to obtain a converted-code training set composed of the new codes, merging the input code training set and the converted-code training set into an expanded training set, and converting code texts in the expanded training set into code images; and S2, training of high-robustness model: converting the code images into vectors required by model training through data pre-processing, randomly picking samples of an identical class from the expanded training set, pairing the samples into matched sample pairs, and inputting the matched sample pairs into a feature extractor, iteratively updating the feature extractor and the matched sample pairs by means of contrastive learning and extracting target characteristics, and training the extracted invariant features in a classifier, so as to produce a high-robustness model.

Figure 2:
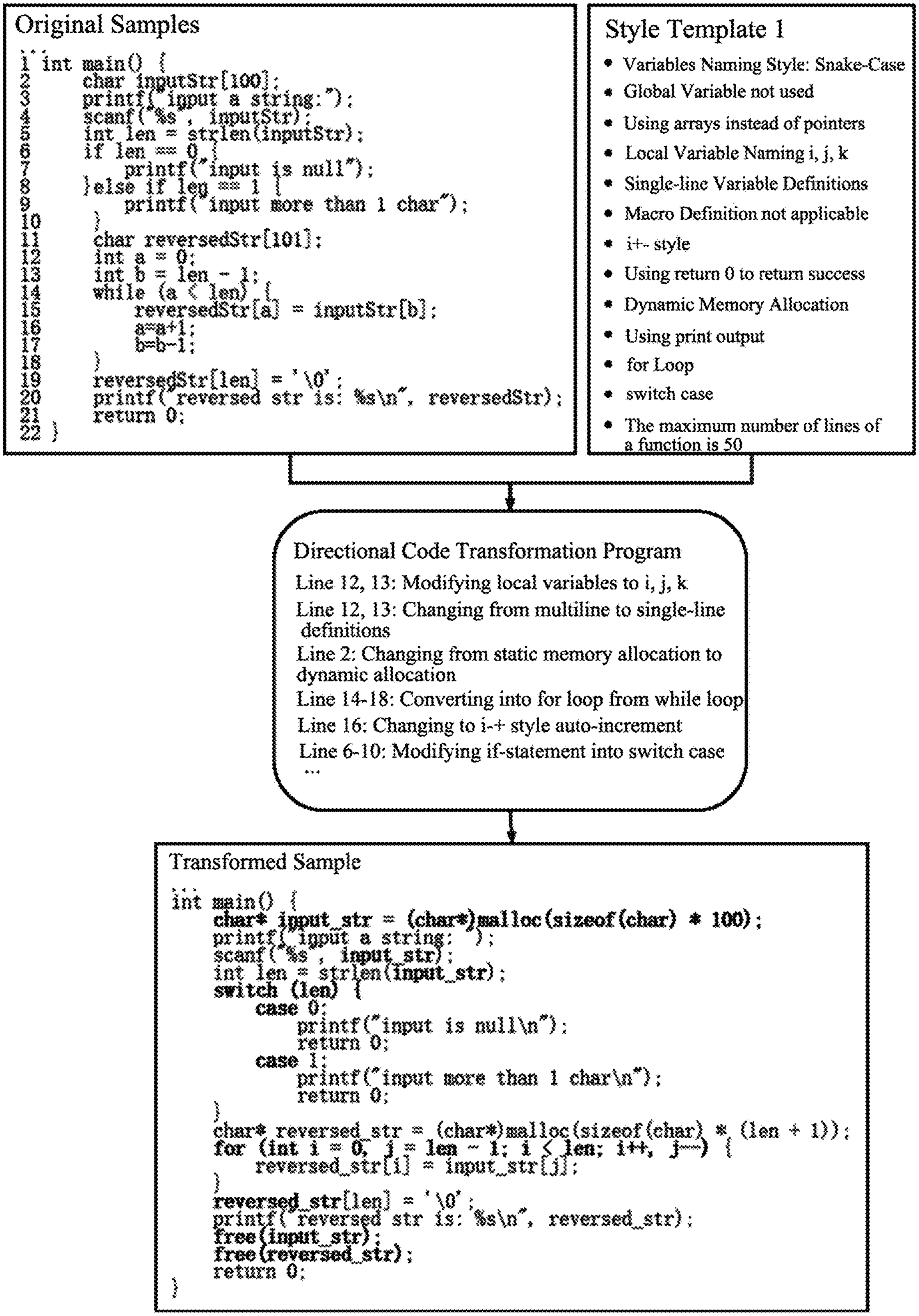
FIG. 2 is a flowchart of code augmentation based on template styles according to one preferred mode of the present disclosure.

Preferably, in the disclosure, a "style template" refers to a combination of non-robustness features. As shown in FIG. 2, "Style Template 1" is one kind of style template, and it directs the transformation of a code.

Preferably, in the disclosure, a "code conversion program" serves to use in a code sample and identify any style inconsistent with the style template, so as to rewrite the code into a new code that has a different style but has the same functions as compared to the source code.

Preferably, in the disclosure, a deep learning model (having n layers) is divided into two parts, namely a feature extractor and a classifier. The feature extractor takes up the first r layers (n>r) of the model. Its function is to extract features of an input sample and represent the features as feature vectors. The classifier is at the latest n-r layers of the model, and serves to perform classification with the feature vectors provided by the feature extractor.

Preferably, the neural network model may be any one of the following network structures: ResNet, AlexNet, DenseNet, and VGG, and is preferably ResNet.

Preferably, the step S1 may comprise the following sub-steps:

- S1.1, generating plural style templates from non-robustness features: analyzing the existing source-code classification model and attack means that have been applied thereto, and summarizing transformation target characteristics and transformation modes generated by the attack means for attacking code samples, wherein the target characteristics receiving attacks are used as the non-robustness features for classification, and different combinations of the non-robustness features are picked to form the different style templates distinctive from each other;
- S1.2, directional transformation and augmentation of codes: applying the code conversion program to the input code training set, according to code style templates performing directional transformation of the style templates on the codes in the input code training set, so as to generate the new codes semantically unchanged but changed in style, wherein each of the style templates is associated with a said converted-code training set, and the input code training set and the converted-code training set are merged into the expanded training set; and
- S1.3, converting code texts into code images: using a text-image conversion tool to process the code texts of the expanded training set, and generating the specially processed code images from the input code texts, wherein the specially processed code images are preferably highlighted code images.

Preferably, in the step S1.2, a preferred mode of the code synonymous substitution process to perform directional transformation of the template styles is: transforming the code into an intermediate format; performing directional transformation on the intermediate format text according to the template styles; and transforming the intermediate format text into a code, so as to generate a new code semantically identical but different in style. Therein, each template style can produce a converted-code training set.

Preferably, in the step S1.3, a preferred mode of highlighting code images is: transforming the code text into an intermediate format text, wherein the intermediate format text may be in the format of HTML or Markdown; highlighting code keywords in the intermediate format text, and then using a tool to convert the intermediate format text into a code image sample, wherein a code keyword is a predefined word in the programming language, and has particular functions and meanings. For example, "if", "else" and "for" are all keywords for controlling the code process. Just like "verbs" in human languages, they drive operation of codes.

According to a preferred mode, the step S1 may be performed together with the following sub-steps:

- S1.1, generating plural style templates from non-robustness features: analyzing existing source-code classification models and attack means against them, and summarizing transformation target characteristics and transformation modes generated by the attack means for attacking code samples; defining attacked target features as non-robustness features, and classifying the non-robustness features; and extracting different combinations of features to form plural style templates different from each other, wherein the transformation target characteristics may include the nomenclature for variables, the control flow, and array space allocation, and transformation may include equivalent transformation between for loop and while loop, and renaming variables from the Camel-Case style to the Snake-Case style, wherein exemplary style templates are shown in FIG. 2;
- S1.2, directional transformation and augmentation of codes: referring to FIG. 2, inputting code samples and template styles; scanning the input codes and identifying style points different from the templates, wherein srcML is an XML format for source codes; using a srcML toolkit to convert the code into the XML intermediate form; using an XML tool to transform the different point into the XML format; and after style transformation, converting XML back to the original code form, with the new code sample having the class tag of the input code, wherein each template style produces a converted-code training set; and merging the input code training set and the converted-code training sets into the expanded training set;
- S1.3, converting code texts into code images: transforming all the codes and input code texts into the format of html, with keywords of the codes highlighted using a js template, and then using an imgkit package to convert the generated html file into highlighted code images, wherein the imgkit package is a tool for transforming html into images.

Preferably, the step S2 may comprise the following sub-steps:

- S2.1, data pre-processing: performing necessary processing operations, such as scaling, cutting and/or normalization, on the images; and converting the images into vectors usable in model training;
- S2.2, randomly extracting same-class samples from the expanded training set for pairing: same-class samples from different sample sets are randomly extracted from the expanded training set composed of the input code training set and the converted-code training set for pairing, so as to generate random sample pairs;
- S2.3, iteratively updating the feature extractor and matched sample pairs using a contrastive learning method: dividing the model into two parts, namely the feature extractor and the classifier, inputting the randomly picked pairs of the samples of the identical class into the feature extractor, figuring out differences among the samples using a contrastive loss function; iteratively updating the feature extractor and matched sample pairs; replacing the randomly picked sample pairs with new sample pairs; and performing training iteratively until training of the feature extractor reaches convergence;

S2.4, training classifier of the model with invariant features: inputting the latest sample pairs into the feature extractor, extracting the target characteristics, and inputting the target characteristics into the classifier for training, until training of the classifier reaches convergence, wherein the target characteristics are invariant high-robustness features.

Preferably, in the step S2.3, a preferred mode of computing of the contrastive loss function is: taking vector pairs of the sample pairs as the input; outputting a pair of feature vectors by the feature extractor; and using the contrastive loss function to determine the difference of the paired feature vectors.

Preferably, in the present disclosure, the "contrastive loss function" is a loss function used in machine learning for determining similarity between two data points. During training, it is a common expectation that two similar data points have similar outputs, whereas two non-similar data points have non-similar outputs. The contrastive loss function is an approach to this end.

Figure 3:
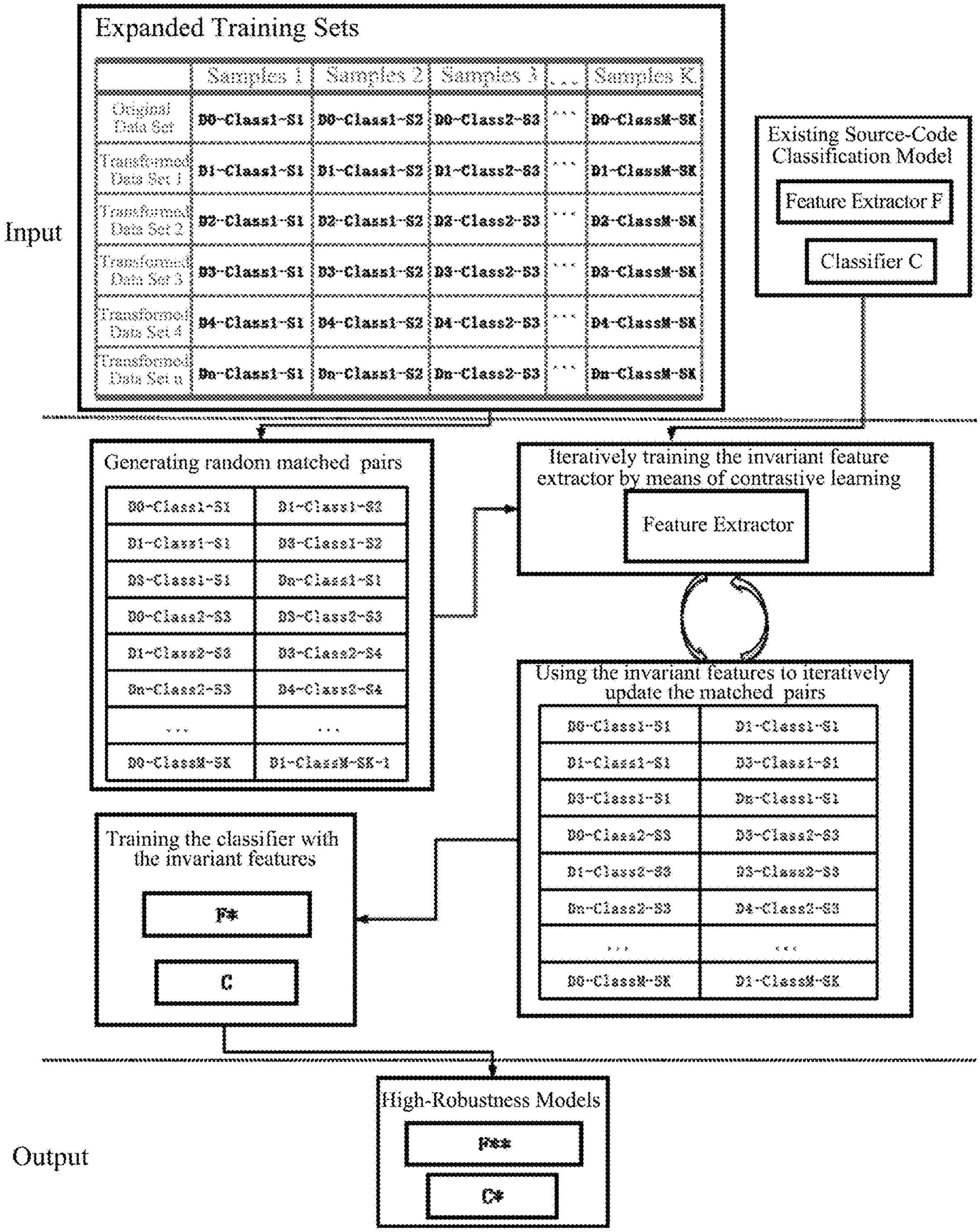
FIG. 3 is a flowchart of iterative updating of sample pairs and the feature extractor according to one preferred mode of the present disclosure.

According to a preferred mode, the step S2 may be performed together with the following sub-steps:

S2.1, data pre-processing: adjusting the color channel, the width and the height of the images, and performing processing operations such as scaling, cutting and/or normalization, so as to convert the image into a vector usable for model training;

S2.2, randomly extracting same-class samples from the expanded training set for pairing: referring to FIG. 3, combining the input code training set and the converted-code training set into an expanded training set, in which each row contains all samples of a data set and each column contains a sample and its corresponding transformed sample, wherein D0-DN represent sample sets 1-N, Class1-ClassM represent classes 1-M, and S represents a code sample, wherein if two different sample sets have the same code Si, it means that the two codes have the same contents but are of different style; and randomly extracting same-class samples from different sample sets for pairing, so as to generate random sample pairs;

S2.3, iteratively updating the feature extractor and matched sample pairs using a contrastive learning method: referring to FIG. 3, dividing the n-layer model into two parts, which include an invariant feature extractor F at the first r layers of the model and a classifier C at the latest n-r layers; inputting randomly extracted same-class sample pairs to the feature extractor; figuring out differences among the samples using a contrastive loss function, wherein the loss function for contrastive learning may be any of ERM, MMD and CORAL; iteratively updating the feature extractor and matched sample pairs; replacing the randomly picked sample pairs with new sample pairs; and performing training iteratively until training of the feature extractor reaches convergence; and S2.4, training classifier of the model with invariant features: inputting the latest sample pairs into the feature extractor F*, extracting the target characteristics, and inputting these features into the classifier C for training until training of the classifier reaches convergence, wherein the loss function may be a cross-entropy loss function and the target characteristics are invariant high-robustness features.

Embodiment 2

The present embodiment provides further improvements on Embodiment 1, and repeated details are omitted from the description thereof.

Figure 4:
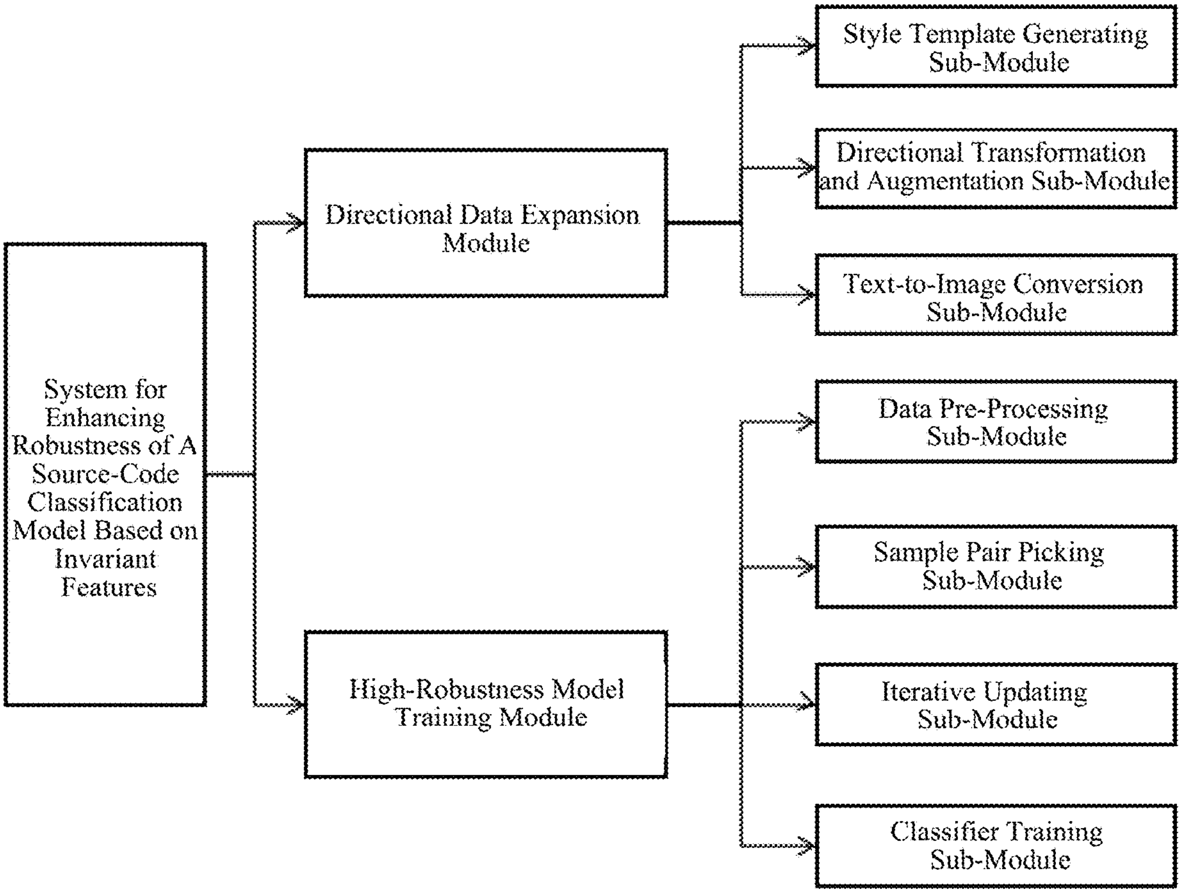
FIG. 4 is a structural diagram of a system for enhancing robustness of a source-code classification model based on invariant features according to one preferred mode of the present disclosure.

The present disclosure further provides a system for enhancing robustness of a source-code classification model based on invariant features, which as a structure as shown in FIG. 4 and comprises the following modules:

a training set-expanding module, for combining non-robustness features to generate a plurality of different style templates, converting codes in an input code training set into new codes of different styles using a code conversion program, so as to obtain a converted-code training set composed of the new codes, merging the input code training set and the converted-code training set into an expanded training set, and converting code texts in the expanded training set into code images; and a model-training module, for converting the code images into vectors required by model training through data pre-processing, randomly picking samples of an identical class from the expanded training set, pairing the samples into matched sample pairs, and inputting the matched sample pairs into a feature extractor, iteratively updating the feature extractor and the matched sample pairs by means of contrastive learning and extracting target characteristics, and training the extracted invariant features in a classifier, and outputting a high-robustness model.

According to a preferred mode, the training set-expanding module may comprise:

a style template generating sub-module, for analyzing existing source-code classification models and attack means against them, and summarizing transformation target characteristics and transformation modes generated by the attack means for attacking code samples; defining attacked target features as non-robustness features, and classifying the non-robustness features; and extracting different combinations of features to form plural style templates different from each other, wherein the transformation target characteristics may include the nomenclature for variables, the control flow, and array space allocation, and transformation may include equivalent transformation between for loop and while loop, and renaming variables from the Camel-Case style to the Snake-Case style;

a directional transformation and augmentation sub-module, for scanning input code samples and template styles and identifying style points different from the templates, wherein srcML is an XML format for source codes; using a srcML toolkit to convert the code into the XML intermediate form; using an XML tool to transform the different point into the XML format; and after style transformation, converting XML back to the original code form, with the new code sample having the class tag of the input code, wherein each template style produces a converted-code training set; and merging the input code training set and the converted-code training sets into the expanded training set; and a text-to-image conversion sub-module, for transforming code texts of the into the expanded training set in the directional transformation and augmentation sub-module into the format of html, with keywords of the codes highlighted using a js template, and then using an imgkit package to convert the generated html file into highlighted code images, wherein the imgkit package is a tool for transforming html into images.

According to a preferred mode, the model-training module may comprise:

a data pre-processing sub-module, for adjusting the color channel, the width and the height of the images, and performing processing operations such as scaling, cutting and/or normalization, so as to convert the image into a vector usable for model training;

a sample pair picking sub-module, for, from the expanded training set composed of the input code training set and the converted-code training set, randomly extracting samples being in the same class but belonging to different training sets for pairing;

an iterative updating sub-module, for dividing the model into two parts, namely the feature extractor and the classifier, and training the feature extractor; inputting randomly extracted same-class sample pairs to the feature extractor; figuring out differences among the samples using a contrastive loss function, wherein the loss function for contrastive learning may be any of ERM, MMD and CORAL; iteratively updating the feature extractor and matched sample pairs; replacing the randomly picked sample pairs with new sample pairs; and performing training iteratively until training of the feature extractor reaches convergence; and a classifier training sub-module, for receiving the latest matching samples, using the feature extractor to extract invariant features, and inputting these features to the classifier for training until convergence, so as to output a high-robustness model.

Embodiment 3

The present embodiment provides further improvements on Embodiments 1 and/or 2, and repeated details are omitted from the description thereof.

The present embodiment discloses a processor, which comprises the system as described in Embodiment 2 or executes the method as described in Embodiment 1 via a computer program. Therein, the computer program may be stored in a storage medium.

Exemplary, the disclosed method executed via a computer program involves use of a server modeled Dell R740, a CPU modeled Intel® Xeon® Gold 6132 @2.60 GHz, a GPU modeled Tesla M40, a RAM of 128 GB DDR4 RAM, and a memory capacity of 1 TB SSD+4 TB HDD.

Preferably, the disclosed method, system and/or processor are used to process massive source code data in code classification tasks, such as code function classification tasks, code clone detection, code authorship attribution, vulnerability detection, etc. During detection of source code vulnerability, the present disclosure may be used to classify codes in the code library, so as to differentiate codes with security concern from those without security concern. A code classification model trained according to the present disclosure has high classification accuracy, high model robustness, and low attack risk.

Preferably, in the present disclosure, the data processed by the processor are mainly source codes (.c\.java\.cpp). These source codes may be code text files using different programming language. The data are transmitted to the server through a high-speed network interface or USB interface, and are stored in an SSD or an HDD of the server. The processor reads data to be processed from these storage media and performs operations like data cleaning and normalization. At last, the processed data are used for training the classification model.

Preferably, the processed data include the model obtained through training and results output by the trained model, and are usually sent to a storage medium of the server, such as an SSD or an HDD. The data may be used in subsequent code analysis tasks, for such as code security check, code quality evaluation, etc. The analysis results may help developers in improvement of code quality, removal of security concerns in the codes, thereby achieving practical production or applications.

Preferably, after processing, the data are stored in the storage medium of the server in the forms of model files and output results. When the data are to be used in an external device, such as a personal computer of a developer or another server, the data may be transmitted to the device through a network interface or a USB interface. Further, code classification services and code classification model training services may be provided for a comprehensive technical service platform through an API interface.

It is to be noted that the particular embodiments described previously are exemplary. People skilled in the art, with inspiration from the disclosure of the present disclosure, would be able to devise various solutions, and all these solutions shall be regarded as a part of the disclosure and protected by the present disclosure. Further, people skilled in the art would appreciate that the descriptions and accompanying drawings provided herein are illustrative and form no limitation to any of the appended claims. The scope of the present disclosure is defined by the appended claims and equivalents thereof. The disclosure provided herein contains various inventive concepts, such of those described in sections led by terms or phrases like "preferably", "according to one preferred mode" or "optionally". Each of the inventive concepts represents an independent conception and the applicant reserves the right to file one or more divisional applications therefor. Throughout the disclosure, any feature following the term "preferably" is optional but not necessary, and the applicant of the present application reserves the rights to withdraw or delete any of the preferred features any time.

What is claimed is:

1. A method for enhancing robustness of a source-code classification model, based on invariant features, wherein the method comprises steps of:

combining non-robustness features to generate a plurality of different style templates, converting codes in an input code training set into new codes of different styles based on the plurality of different style templates, using a code conversion program, so as to obtain a converted-code training set composed of the new codes, merging the input code training set and the converted-code training set into an expanded training set, and converting code texts in the expanded training set into code images; and converting the code images into vectors required by model training through data pre-processing, randomly picking samples of an identical class from the expanded training set, pairing the samples into matched sample pairs, and inputting the matched sample pairs into a feature extractor, iteratively updating the feature extractor to extract invariant features and the matched sample pairs by means of contrastive learning and extracting target characteristics, and training the extracted invariant features in a classifier, so as to produce a source-code classification model with enhanced robustness, wherein the step of iteratively updating the feature extractor and the matched sample pairs by the means of contrastive learning and extracting the target characteristics comprises: dividing the source-code classification model into two parts, namely the feature extractor and the classifier, inputting the randomly picked pairs of the samples of the identical class matched sample pairs into the feature extractor, figuring out differences among the samples using a contrastive loss function, iteratively updating the feature extractor and the matched sample pairs, replacing the randomly picked sample samples paired into the matched sample pairs with new sample pairs, and performing training the feature extractor iteratively until training of the feature extractor reaches convergence, wherein the loss function is a cross-entropy loss function and the target characteristics are invariant high-robustness features.

2. The method of claim 1, wherein the step of combining the non-robustness features to generate the plurality of different style templates comprises:

analyzing the existing source-code classification model and attack means that have been applied thereto; and summarizing the transformation target characteristics and transformation modes generated by the attack means for attacking code samples, wherein the target characteristics receiving attacks are used as the non-robustness features for classification, and different combinations of the non-robustness features are picked to form the different style templates distinctive from each other.

3. The method of claim 1, wherein the step of converting the codes in the input code training set into the new codes of the different styles using the code conversion program, so as to obtain the converted-code training set composed of the new codes, merging the input code training set and the converted-code training set into the expanded training set comprises: applying the code conversion program to the input code training set, according to the style templates performing directional transformation of the style templates on the codes in the input code training set, so as to generate the new codes semantically unchanged but changed in style, wherein each of the style templates is associated with said converted-code training set, and the input code training set and the converted-code training set are merged into the expanded training set.

4. The method of claim 1, wherein the step of converting the code texts in the expanded training set into the code images comprises: using a text-image conversion tool to process the code texts of the expanded training set, and generating specially processed code images from the input code texts.

5. The method of claim 1, wherein the data pre-processing comprises:

scaling, cutting and/or normalization.

6. The method of claim 1, wherein the step of randomly picking the samples of the identical class from the expanded training set, pairing the samples into the matched sample pairs, and inputting the matched sample pairs into the feature extractor comprises:

randomly picking the samples of the identical class and of different said training sets from the expanded training set composed of the input code training set and the converted-code training set, and pairing the samples.

7. The method of claim 1, wherein the step of training the extracted invariant features in the classifier comprises: inputting the latest sample pairs into the feature extractor, extracting the target characteristics, and inputting the target characteristics into the classifier for training, until training of the classifier reaches convergence.

8. A processor configured to execute the method of claim 1 via a computer program.

9. A system for enhancing robustness of a source-code classification model, based on invariant features, wherein the system comprises a processor and a storage medium, wherein the processor is configured to execute a computer program stored in the storage medium in the form of a computer program to be executed by the processor, wherein the computer program comprises:

a training set-expanding module, for combining to combine non-robustness features to generate a plurality of different style templates, converting codes in an input code training set into new codes of different styles based on the plurality of different style templates, using a code conversion program, so as to obtain a converted-code training set composed of the new codes, merging the input code training set and the converted-code training set into an expanded training set, and converting code texts in the expanded training set into code images; and a model-training module, for converting to convert the code images into vectors required by model training through data pre-processing, randomly picking samples of an identical class from the expanded training set, pairing the samples into matched sample pairs, and inputting the matched sample pairs into a feature extractor, iteratively updating the feature extractor to extract invariant features and the matched sample pairs by means of contrastive learning and extracting target characteristics, and training the extracted invariant features in a classifier, so as to produce a source-code classification model with enhanced robustness, wherein the step of iteratively updating the feature extractor and the matched sample pairs by the means of contrastive learning and extracting the target characteristics comprises: dividing the source-code classification model into two parts, namely the feature extractor and the classifier, inputting the randomly picked pairs of the samples of the identical class matched sample pairs into the feature extractor, figuring out differences among the samples using a contrastive loss function, iteratively updating the feature extractor and the matched sample pairs, replacing the randomly picked sample samples paired into the matched sample pairs with new sample pairs, and performing training the feature extractor iteratively until training of the feature extractor reaches convergence, wherein the loss function is a cross-entropy loss function and the target characteristics are invariant high-robustness features.

10. The system of claim 9, wherein the step of combining the non-robustness features to generate the plurality of different style templates comprises:

analyzing the existing source-code classification model and attack means that have been applied thereto; and summarizing the transformation target characteristics and transformation modes generated by the attack means for attacking code samples, wherein the target characteristics receiving attacks are used as the non-robustness features for classification, and different combinations of the non-robustness features are picked to form the different style templates distinctive from each other.

11. The system of claim 9, wherein the step of converting the codes in the input code training set into the new codes of the different styles using the code conversion program, so as to obtain the converted-code training set composed of the new codes, merging the input code training set and the converted-code training set into the expanded training set comprises: applying the code conversion program to the input code training set, according to the style templates performing directional transformation of the style templates on the codes in the input code training set, so as to generate the new codes semantically unchanged but changed in style, wherein each of the style templates is associated with said converted-code training set, and the input code training set and the converted-code training set are merged into the expanded training set.

12. The system of claim 9, wherein the step of converting the code texts in the expanded training set into the code images comprises: using a text-image conversion tool to process the code texts of the expanded training set, and generating specially processed code images from the input code texts.

13. The system of claim 9, wherein the data pre-processing comprises scaling, cutting and/or normalization.

14. The system of claim 9, wherein the step of randomly picking the samples of the identical class from the expanded training set, pairing the samples into the matched sample pairs, and inputting the matched sample pairs into the feature extractor comprises:

randomly picking the samples of the identical class and of different said training sets from the expanded training set composed of the input code training set and the converted-code training set, and pairing the samples.

15. The system of claim 9, wherein the step of training the extracted invariant features in the classifier comprises: inputting the latest sample pairs into the feature extractor, extracting the target characteristics, and inputting the target characteristics into the classifier for training, until training of the classifier reaches convergence.

* * * * *